United States Patent
Ikeda et al.

(10) Patent No.: US 7,598,311 B2
(45) Date of Patent: Oct. 6, 2009

(54) RUBBER PRODUCT AND METHOD FOR MANUFACTURING THE SAME

(75) Inventors: Hidehito Ikeda, Kasugai (JP); Yoshio Okado, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 654 days.

(21) Appl. No.: 11/074,842

(22) Filed: Mar. 9, 2005

(65) Prior Publication Data

US 2005/0203241 A1    Sep. 15, 2005

(30) Foreign Application Priority Data

Mar. 9, 2004 (JP) ............... 2004-066302
Jun. 25, 2004 (JP) ............... 2004-188275

(51) Int. Cl.
*C08K 3/04* (2006.01)

(52) U.S. Cl. .................................. 524/495

(58) Field of Classification Search ........... 524/495
See application file for complete search history.

(56) References Cited

U.S. PATENT DOCUMENTS

| | | | |
|---|---|---|---|
| 4,263,078 A | 4/1981 | Millen et al. | |
| 4,314,920 A | 2/1982 | Millen | |
| 4,374,225 A | 2/1983 | Kawakubo et al. | |
| 4,481,159 A * | 11/1984 | Itoh | 264/403 |
| 6,277,901 B1 | 8/2001 | Hensel | |
| 6,335,407 B1 * | 1/2002 | Tanaka et al. | 526/238.3 |
| 2001/0025071 A1 * | 9/2001 | Fruh et al. | 524/392 |
| 2002/0113376 A1 * | 8/2002 | Yabe et al. | 277/570 |
| 2003/0104151 A1 * | 6/2003 | Buono et al. | 428/36.91 |

FOREIGN PATENT DOCUMENTS

| | | |
|---|---|---|
| DE | 197 39 475 A1 | 3/1998 |
| EP | 0 111 391 A | 6/1984 |
| EP | 0 831 123 A1 | 3/1998 |
| EP | 831123 A1 * | 3/1998 |
| EP | 1 179 560 A1 | 2/2002 |
| GB | 988 846 A | 4/1965 |
| GB | 1 083 528 A | 9/1967 |
| JP | 10-152583 A | 6/1998 |
| JP | 10-180941 | 7/1998 |
| JP | 2002-088192 A | 3/2002 |
| JP | 2004-091508 A | 3/2004 |

OTHER PUBLICATIONS

Database WPI, Section Ch, Week 199433, Derwent Publications Ltd., London, GB; AN 1994-269581 XP002331240 and JP 06 200097A, Jul. 19, 1994.

Database WPI, Section Ch, Week 199216, Derwent Publications Ltd., London, GB; AN 1992-129614, XP002331241 and JP 04 076063A, Mar. 10, 1992.

Japanese Office Action dated Mar. 24, 2009, issued in corresponding Japanese Patent Application No. 2004-188275.

* cited by examiner

*Primary Examiner*—Randy Gulakowski
*Assistant Examiner*—Alicia M Toscano
(74) *Attorney, Agent, or Firm*—Westerman, Hattori, Daniels & Adrian, LLP

(57) ABSTRACT

A method for manufacturing a rubber product including masticating polymer with carbon black and factice is provided. A high-quality rubber product manufactured by this method is also provided. According to the present method, the carbon black is prevented from separating from a polymer and reaggregating, while the work environment is not deteriorated. A rubber composition prepared by the present method can be vulcanized and molded to manufacture the rubber product.

9 Claims, No Drawings

RUBBER PRODUCT AND METHOD FOR MANUFACTURING THE SAME

BACKGROUND OF THE INVENTION

1. Field of the Invention

The present invention relates to a rubber product and a method for manufacturing the rubber product.

2. Description of the Art

Conventionally, automotive radiator hoses and other rubber products have been made from a rubber composition containing polymer, such as ethylene-propylene-diene monomer (EPDM), a reinforcing agent, such as carbon black, a vulcanizing agent, such as sulfur, and a plasticizer, such as oil. The rubber composition is typically prepared through a mastication process and a kneading process. In the mastication process, the polymer is plasticized by the application of shearing force to disentangle molecules or the cleavage of molecular linkages. The plasticized polymer is mixed with carbon black, sulfur, oil, and other materials in the kneading process. For further details, see Japanese Unexamined Patent Application Publication No. 10-180941 and "Gomu no Jiten" (an encyclopedia of rubber), edited by Michio Okuyama et al., Asakura-shoten, Tokyo (2000), p. 303.

However, low-polarity rubber (rubber having few polar groups), such as EPDM, has a low affinity for carbon black. Thus, it is difficult to disperse the carbon black uniformly in the rubber. Furthermore, when polar carbon black is used to increase the electrical conductivity of a rubber product, the affinity between the low-polarity rubber and carbon black further decreases.

To achieve sufficient mixing, various procedures, including a masterbatch method, have been proposed. However, even using these mixing procedures, carbon black, in particular the polar carbon black, tends to separate from the polymer and may reaggregate over time. The reaggregation results in surface roughness of a final rubber product, and also leads to reduction or variation in the electrical resistance of the rubber product.

On the other hand, the addition of a silane coupling agent, sulfur or a sulfur-based vulcanization accelerator, and/or a phenol-based stabilizer to the rubber composition is proposed to prevent the separation and the reaggregation of the carbon black. However, the silane coupling agent is expensive and increases the production cost. In addition, unpleasant odor of the silane coupling agent deteriorates the work environment. The silane coupling agent may also deteriorate the moldability of extrusion molding and increase the surface roughness of an extrudate. On the other hand, sulfur or the sulfur-based vulcanization accelerator must be mixed at 150° C. or lower. At temperatures higher than 150° C., where general-purpose compounds are often subjected to short-time mixing, sulfur or the sulfur-based vulcanization accelerator seems to have little dispersion effect on the carbon black. While the phenol-based stabilizer, such as those manufactured by Sumitomo Chemical Co. Ltd. under the trade name of Sumilizer GM or Sumilizer GS, is suitably used owing to its excellent dispersion effect on the carbon black, it is very expensive and is not suitable for general use.

SUMMARY OF THE INVENTION

Accordingly, it is an object of the present invention to provide a method for manufacturing a high-quality rubber product while preventing carbon black from separating from a polymer and from reaggregating, without deteriorating the work environment.

It is another object or the present invention to provide a high-quality rubber product manufactured by the present method.

To this end, according to one aspect of the present invention, a method for manufacturing a rubber product, comprises: preparing a rubber composition containing carbon black mixed in a polymer by a rubber kneading procedure including a mastication process and a kneading process; and vulcanizing and molding the rubber composition to manufacture a rubber product, wherein, together with the carbon black, factice is mixed in the polymer in the mastication process.

According to another aspect of the present invention, a rubber product is manufactured by the method.

To solve the problems described above, the present inventors reviewed conventional procedures for preparing a rubber composition. That is, as described above, the conventional procedures involve the mastication process in which the polymer is plasticized by the application of shearing force to disentangle molecules or the cleavage of molecular linkages and the kneading process in which the plasticized polymer is mixed with carbon black, sulfur, oil, and other materials. Thus, conventionally, almost no materials other than the polymer are added in the mastication process. This is partly because the mastication process is usually performed at high temperature. That is, when sulfur is added, for example, vulcanization will start immediately, resulting in scorching during the subsequent processes, such as extrusion molding. Another reason is that carbon black and other materials can be easily dispersed in the polymer after the polymer has been disentangled by means of the mastication process.

However, once the separation and the reaggregation of the carbon black occur, the conventional procedures can hardly prevent them. Without being bound by a particular theory, the present inventors have piled up studies from a new point of view. As a result, the present inventors had mastication process, instead of addition thereof in the kneading process as in the conventional methods. The present inventors found that the addition of carbon black together with factice in the mastication process allows uniform dispersion of the carbon black and prevents the carbon black from separating from the polymer and reaggregating. Thus, the present invention has been attained The reason for this is not obvious but is thought to be as follows. It is thought that the factice, which is an odorless softener derived from plants, increases compatibility between the polymer and the carbon black, and a sulfur or chlorine component in the factice further increases the compatibility and traps a free radical generated by the shearing force during compounding and extrusion, so that separation between carbon black and the polymer and the reaggregation of the carbon black tend not to occur.

As described above, in the present invention, factice, together with carbon black, is mixed in the mastication process for preparing a rubber composition material. This allows uniform dispersion of the carbon black in the rubber polymer and prevents the carbon black from separating from the rubber polymer and reaggregating over time. Thus, high-quality rubber products can be manufactured. The present method does not necessarily require a silane coupling agent to prevent the carbon black from separating from the rubber polymer and reaggregating, and thereby provides an excellent work environment.

In particular, in the mastication process, when the factice content is 1 to 5 parts by weight based on 100 parts by weight of the polymer, the carbon black can be efficiently dispersed without adversely affecting the physical properties of the rubber product.

Furthermore, when the carbon black is polar carbon black, the electrical conductivity of the rubber product can be increased. Although the use of the polar carbon black often causes the separation between the carbon black and the rubber polymer and the reaggregation of the carbon black, these problems are overcome by the present invention. Thus, the use of polar carbon black in the present invention is of further importance and increases utility.

In addition, when the polymer is a low-polarity rubber, such as ethylene-propylene-diene rubber, butyl rubber, natural rubber, isoprene rubber, ethylene-propylene rubber, and/or silicone rubber, the use of these rubbers often causes the separation between the carbon black and the rubber polymer and the reaggregation of the carbon black. However, the present invention Overcomes these problems and is thus highly useful.

The rubber product manufactured by such a method does not exhibit a rough surface due to coagula of the carbon black and has a uniform electrical resistance and high quality.

DESCRIPTION OF THE PREFERRED EMBODIMENTS

The present invention will be described in detail below.

As described above, the method for manufacturing a rubber product according to the present invention involves preparing a rubber composition containing carbon black mixed in a polymer by a rubber kneading procedure including a mastication process and a kneading process and vulcanizing and molding the rubber composition to manufacture a rubber product, wherein, together with the carbon black, factice is mixed in the polymer in the mastication process.

Examples of the polymer include, but are not limited to, chloroprene rubber (CR), acrylonitrile-butadiene rubber (NBR), a blend of NBR and polyvinyl chloride (PVC) (NBR-PVC), hydrogenated NBR (H-NBR), acrylic rubber (ACM), ethylene-acrylic rubber (AEM), epichlorohydrin rubber (ECO), chlorosulfonated polyethylene (CSM), chlorinated polyethylene (CPE), ethylene-propylene-diene rubber (EPDM), butyl rubber (IIR), natural rubber (NR), isoprene rubber (IR), ethylene-propylene rubber (EPM), and silicone rubber (Q). These rubbers are used alone or in combination. Among them, a low-polarity rubber, such as ethylene-propylene-diene rubber (EPDM), butyl rubber (IIR), natural rubber (NR), isoprene rubber (IR), ethylene-propylene rubber (EPM), or silicone rubber (Q), has less affinity for the carbon black. Thus, essentially, it is difficult to disperse the carbon black uniformly in the low-polarity rubber polymer. However, such a problem is overcome by the present invention.

Examples of the carbon black include, but are not limited to, Ketjen black, acetylene black, furnace black, channel black, thermal black, and color black. These are used alone or in combination. Among others, polar carbon black is preferred because it increases the electrical conductivity of the resulting rubber product. Although the use of the polar carbon black often causes the separation between the carbon black and the rubber polymer and the reaggregation of the carbon black, these problems are overcome by the present invention. Thus, the use of polar carbon black in the present invention is of further importance and increases utility in this technical field. In particular, a combination of polar carbon black and low-polarity rubber usually produces significant aggregation. However, the present invention overcomes this problem and is therefore particularly useful for this combination. The polar carbon black is a carbon black having a polar group, such as hydroxyl or carboxyl, on part of the surface, and is intrinsically liable to aggregate. As the polar carbon black, specifically, a carbon black manufactured by Showa Cabot K.K. under the trade name of Showblack IP200 is preferred.

The carbon black content is preferably 50 to 150 parts by weight and more preferably 70 to 130 parts by weight based on 100 parts by weight of the polymer. Less than 50 parts by weight of the carbon black may be insufficient to reinforce the final rubber product. By contrast, more than 150 parts by weight of the carbon black may adversely affect the physical properties, such as flexibility, of the rubber product.

Examples of the factice include, but are not limited to, brown factice, yellow factice, white factice, amber factice, golden factice, neo factice, and sulfur-free factice. These are used alone or in combination. Among them, the brown factice, the golden factice, and the neo factice have higher sulfur contents. Thus, even lower loadings of them can increase the torque of the polymer and improve the dispersion of the carbon black.

The factice content is preferably 1 to 5 parts by weight and more preferably 2 to 5 parts by weight based on 100 parts by weight of the polymer. Less than 1 part by weight of the factice may be insufficient to achieve uniform dispersion of the carbon black. By contrast, more than 5 parts by weight of the factice may adversely affect the physical properties, such as heat resistance and formability, of the rubber product.

These materials are mixed in the mastication process. Typically, they are mixed in an internal mixer, such as a Banbury mixer, at 110° C. to 190° C. for 5 to 10 minutes.

In addition to the materials described above, a softener, an antioxidant, a processing aid, filler, and other additives may be added in the mastication process unless they adversely affect the physical properties of the rubber product. It is needless to say that these additives may be added in the kneading process.

The mastication process is followed by the kneading process. In the kneading process, a vulcanizing agent, such as sulfur, may be mixed with, for example, an open-roll mill. If desired, a vulcanization accelerator, a softener, an antioxidant, a processing aid, filler, and other additives may also be added. For example, they are mixed by the open-roll mill at 50° C. to 80° C. for 2 to 5 minutes.

Sulfur is a preferred vulcanizing agent. The sulfur content is preferably 0.3 to 10 parts by weight and more preferably 0.5 to 5 parts by weight based on 100 parts by weight of the polymer.

Examples of the vulcanization accelerator include, but are not limited to, thiazole-based accelerators, such as 2-mercaptobenzothiazole (MBT), thiuram-based accelerators, such as tetramethylthiurammonosulfide (TMTM), sulfenamide-based accelerators, such as N-cyclohexyl-2-benzothiazyl-sulfenamide (CBS), and dibenzothiazyldisulfide (MBTS).

The content of the vulcanization accelerator is preferably 0.1 to 7 parts by weight and more preferably 0.5 to 4 parts by weight based on 100 parts by weight of the polymer.

In the rubber composition thus prepared, the carbon black rarely separates from the polymer and hardly reaggregates. This can be examined by determining variations in the viscosity of the rubber composition with a Mooney viscometer (for example, manufactured by Toyo Seiki Seisaku-Sho, Ltd.). The separation or the reaggregation of the carbon black will increase the Mooney viscosity. In the rubber composition prepared by the method according to the present invention, little variations in the Mooney viscosity are observed.

The rubber composition thus prepared may be vulcanized and molded into a rubber product of any shape. Examples of the molding include, but are not limited to, extrusion molding, injection molding, and press forming. The conditions of the vulcanization and molding are not limited and depend on the size of the rubber product to be manufactured, the type of the polymer, and other factors.

The method of the present invention may be applied to any rubber product that requires reinforcement and high electrical conductivity by the carbon black: for example, an automotive radiator hose and an electrically conductive roll for an electrophotographic copier. According to the method of the present invention, coagula of the carbon black are reduced and thereby the rubber product has improved surface quality and uniform electrical resistance.

The method and the product of the present invention will be more fully understood from the following examples along with comparative examples.

The materials under the following trade names were used.
EPDM: Esprene 532, Sumitomo Chemical Co. Ltd.
Zinc oxide: from Mitsui Mining And Smelting Company Co. Ltd.
Stearic acid: Lunac S30, Kao Corporation
Carbon black (i): Showblack IP200, Showa Cabot K.K.
Carbon black (ii): #52, Asahi Carbon Co. Ltd.
Filler: Mistron Vapor talc, Nihon Mistron Co. Ltd.
Oil: Diana Process Oil PW-380, Idemitsu Kosan Co. Ltd.
Factice (i): Brown factice, Tenma Factice Mfg. Co. Ltd.
Factice (ii): Golden factice, Tenma Factice Mfg. Co. Ltd.
Factice (iii): Neo factice N, Tenma Factice Mfg. Co. Ltd.
Factice (iv): White factice, Tenma Factice Mfg. Co. Ltd.
Factice (v): Amber factice, Tenma Factice Mfg. Co. Ltd.
Factice (vi): Neo factice U-8, Tenma Factice Mfg. Co. Ltd.
Vulcanization accelerator: Sanceler TT, Sanshin Chemical Industry Co. Ltd.
Sulfur: Sulfur-PTC, Daito Sangyo Co. Ltd.

EXAMPLES

Examples 1 to 8 and Comparative Example 1

Each compound shown in Table 1 other than the vulcanization accelerator and sulfur was masticated with a Banbury mixer for 5 minutes to a final temperature of 180° C. Then, the mixture was transferred to an open-roll mill. After the vulcanization accelerator and sulfur were added, the mixture was kneaded for 2 minutes. The resulting rubber composition was press-formed at 150° C. for 30 minutes into a sheet 2 mm in thickness. The rubber composition was also extruded at 150° C. for 30 minutes and was cured by steam vulcanization into a hose.

TABLE 1

(parts by weight)

| | Examples | | | | | | | | Comparative |
|---|---|---|---|---|---|---|---|---|---|
| | 1 | 2 | 3 | 4 | 5 | 6 | 7 | 8 | Example 1 |
| EPDM | 100 | 100 | 100 | 100 | 100 | 100 | 100 | 100 | 100 |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Carbon black (i) | 120 | 120 | — | 120 | 120 | 120 | 120 | 120 | 120 |
| Carbon black (ii) | — | — | 120 | — | — | — | — | — | — |
| Filler | 60 | 60 | 60 | 60 | 60 | 60 | 60 | 60 | 60 |
| Oil | 60 | 60 | 60 | 60 | 60 | 60 | 60 | 60 | 60 |
| Factice (i) | 2 | 5 | 3 | — | — | — | — | — | — |
| Factice (ii) | — | — | — | 3 | — | — | — | — | — |
| Factice (iii) | — | — | — | — | 3 | — | — | — | — |
| Factice (iv) | — | — | — | — | — | 3 | — | — | — |
| Factice (v) | — | — | — | — | — | — | 3 | — | — |
| Factice (vi) | — | — | — | — | — | — | — | 3 | — |
| Vulcanization accelerator | 4 | 4 | 4 | 4 | 4 | 4 | 4 | 4 | 4 |
| Sulfur | 1 | 1 | 1 | 1 | 1 | 1 | 1 | 1 | 1 |

Comparative Example 2

EPDM was masticated alone. A rubber composition was prepared as in Example 1 except that the other materials were added in the kneading process. A sheet and a hose were molded from the rubber composition as in Example 1.

The sheets and hoses of Examples and Comparative Examples were tested according to the following procedures, and the results are shown in Table 2:

[Physical Properties Before Vulcanization]

Before the vulcanization, the viscosity of the rubber composition was measured with a Mooney viscometer (Toyo Seiki Seisaku-Sho, Ltd.) at 100° C. at 20 and 60 minutes after the preparation. Maximum errors $\Delta M_1$ [$ML_{1+4}$ 100° C., 20 min] and $\Delta M_2$ [$ML_{1+4}$ 100° C., 60 min] were calculated based on the Mooney viscosities [$ML_{1+4}$ 100° C.].

[Electrical Resistance]

The surface resistivity $\rho s$ ($\Omega$) and the volume resistivity $\rho v$ ($\Omega$ cm) of the sheet were measured at 25° C. and 64% RH according to JIS K 6911.

[Surface Roughness of Extrudate]

Surface roughness of the hose was visually evaluated and was rated as good, fair, or poor.

TABLE 2

| | Examples | | | | | | | | Comparative Examples | |
| --- | --- | --- | --- | --- | --- | --- | --- | --- | --- | --- |
| | 1 | 2 | 3 | 4 | 5 | 6 | 7 | 8 | 1 | 2 |
| $\Delta M_1$ [ML$_{1+4}$ 100° C., 20 min] | 6.5 | 4.6 | 5.8 | 5.8 | 5.9 | 6.2 | 6.0 | 6.4 | 19.6 | 16.4 |
| $\Delta M_1$ [ML$_{1+4}$ 100° C., 60 min] | 7.6 | 5.8 | 6.9 | 7.3 | 7.2 | 7.9 | 8.0 | 8.2 | ≧30* | ≧30* |
| surface resistivity $\rho s$ ($\Omega$) | $9.0 \times 10^7$ | $5.0 \times 10^8$ | $3.2 \times 10^8$ | $2.4 \times 10^8$ | $3.0 \times 10^8$ | $3.7 \times 10^8$ | $2.1 \times 10^8$ | $1.4 \times 10^8$ | $2.1 \times 10^7$ | $3.1 \times 10^7$ |
| volume resistivity $\rho v$ ($\Omega$ cm) | $7.6 \times 10^6$ | $5.0 \times 10^7$ | $2.6 \times 10^7$ | $1.6 \times 10^7$ | $2.1 \times 10^7$ | $2.5 \times 10^7$ | $1.2 \times 10^7$ | $9.6 \times 10^6$ | $1.5 \times 10^6$ | $2.3 \times 10^6$ |
| Surface roughness | Good | Good | Good | Good | Good | Good | Good | Good | Poor | Fair |

*The value exceeded the limit of measurement.

The results show that, according to the present invention, the hoses had a smooth surface and the Mooney viscosities of the rubber compositions exhibited little variations. Thus, the separation and the reaggregation of the carbon black were prevented. The sheets according to the present invention had higher electrical resistances than the comparative examples at the same carbon content. This demonstrates improved dispersion of the carbon black according to the present invention. The improved dispersion of the carbon black was also observed for other polymers, such as IIR, NR, IR, EPM, and Q, instead of EPDM (not shown).

By contrast, in the comparative examples, the Mooney viscosities varied greatly, and inferior surface qualities and reduced electrical resistances owing to the aggregation of the carbon black were observed. Particularly when the comparative example 2 is compared with the example 1, both having the same rubber composition, it is clear that the addition of the carbon black and the factice in the kneading process resulted in poor dispersion of the carbon black.

What is claimed is:

1. A method for manufacturing a rubber product, comprising:
   preparing a rubber composition containing carbon black mixed in a polymer by a rubber kneading procedure including a mastication process and a kneading process; and
   vulcanizing and molding the rubber composition to manufacture a rubber product,
   wherein, together with the carbon black, factice is mixed in the polymer in the mastication process, content of the carbon black being 50 to 150 parts by weight and content of factice being 1 to 5 parts by weight based on 100 parts by weight of the polymer,
   wherein the mastication process is conducted at 110° C. to 190° C. and the rubber composition contains no filler other than carbon black and talc.

2. The method for manufacturing a rubber product according to claim 1, wherein the carbon black is polar carbon black.

3. The method for manufacturing a rubber product according to claim 1, wherein the polymer is at least one low-polarity rubber selected from the group consisting of ethylene-propylene-diene rubber, butyl rubber, natural rubber, isoprene rubber, ethylene-propylene rubber, and silicone rubber.

4. The method for manufacturing a rubber product according to claim 2, wherein the polymer is at least one low-polarity rubber selected from the group consisting of ethylene-propylene-diene rubber, butyl rubber, natural rubber, isoprene rubber, ethylene-propylene rubber, and silicone rubber.

5. A rubber product manufactured by the method according to claim 1.

6. A rubber product manufactured by the method according to claim 2.

7. A rubber product manufactured by the method according to claim 3.

8. A rubber product manufactured by the method according to claim 4.

9. A method for manufacturing a rubber product, comprising:
   preparing a rubber composition containing carbon black mixed in a polymer by a rubber kneading procedure including a mastication process and a kneading process; and
   vulcanizing and molding the rubber composition to manufacture a rubber product,
   wherein, together with the carbon black, factice is mixed in the polymer in the mastication process at a temperature of 110° C. to 190° C., content of the carbon black being 50 to 150 parts by weight and content of factice being 1 to 5 parts by weight based on 100 parts by weight of the polymer.

* * * * *